(12) United States Patent
Chen

(10) Patent No.: US 8,661,638 B2
(45) Date of Patent: Mar. 4, 2014

(54) WHEEL CYLINDER ADJUSTER

(76) Inventor: Shu-Hui Chen, Taichung (TW)

(*) Notice: Subject to any disclaimer, the term of this patent is extended or adjusted under 35 U.S.C. 154(b) by 201 days.

(21) Appl. No.: 13/441,005

(22) Filed: Apr. 6, 2012

(65) Prior Publication Data

US 2013/0263704 A1    Oct. 10, 2013

(51) Int. Cl.
| | |
|---|---|
| *B25B 27/00* | (2006.01) |
| *B25B 27/14* | (2006.01) |
| *B25B 13/48* | (2006.01) |
| *F16D 65/00* | (2006.01) |

(52) U.S. Cl.
CPC ............ *B25B 27/00* (2013.01); *B25B 27/0035* (2013.01); *F16D 65/0043* (2013.01)
USPC .............................................. 29/239; 81/52

(58) Field of Classification Search
USPC ........ 81/52, 177.5; 254/98, 231; 29/238, 239, 29/256, 263, 266
See application file for complete search history.

(56) References Cited

U.S. PATENT DOCUMENTS

| | | | | |
|---|---|---|---|---|
| 5,018,261 | A * | 5/1991 | Markous | 29/239 |
| 6,085,398 | A * | 7/2000 | Arch | 29/239 |
| 6,192,566 | B1 * | 2/2001 | Dunum | 29/239 |
| 6,574,846 | B1 * | 6/2003 | Kang | 29/239 |

* cited by examiner

*Primary Examiner* — David B Thomas

(57) ABSTRACT

A wheel cylinder adjuster includes plural actuating discs able to match different-sized wheel cylinders, and a driving wrench able to be jointed with the actuating disc. The driving wrench has two ends of its shank respectively provided with right-handed threads and left-handed threads on the surface, having a crosswise insert hole respectively bored at an outer side of the right-handed threads and of the left-handed threads, and the shank has two ends respectively protruding outward to form a positioning rod to be inserted in the insert hole of the actuating disc. Two positioning sleeves are respectively combined with the right-handed threads and the left-handed threads at the two ends of the shank. A holding rod is inserted in either one of the two insert holes at two ends of the driving wrench, and a positioning stop plate is provided to fix one of the two positioning sleeves.

2 Claims, 6 Drawing Sheets

WHEEL CYLINDER ADJUSTER

BACKGROUND OF THE INVENTION

1. Field of the Invention

This invention relates to a wheel cylinder adjuster, particularly to one able to adjust the left-sided and the right-sided wheel cylinders of an automobile by means of a single driving wrench cooperating with an actuating disc.

2. Description of the Prior Art

A conventional wheel cylinder adjuster, as disclosed in a Taiwanese patent No. 392552, titled "Improved pump adjustment device structure of a disc brake" includes an actuating disc able to be axially jointed with a wheel cylinder, and a driving wrench able to be jointed with the actuating disc and actuated to rotate and shift axially. The actuating disc is provided with a hollow cylindrical positioning shaft protruding upward at a dead center of the disc surface, and the positioning shaft has its outer diameter corresponding with the inner diameter of the central valve port of the wheel cylinder. Two pivotal holes are respectively bored at locations of two ends of the diameter of the positioning shaft, and at least one positioning hole is bored at a reserved end of a radius of the outer circumference of the positioning shaft for a positioning post to be axially fixed therein. The driving wrench has an axial end mounted with a driving disc having its center formed with a receiving recess secured therein with a powerful magnet, and the receiving recess has its outer circumference disposed with two fixing studs protruding upward at locations respectively corresponding with the pivotal holes of the actuating disc so that the actuating disc can quickly be attracted by the powerful magnet and firmly combined with the driving wrench. By so designing, the wheel cylinder can quickly be disassembled with great convenience and with stability by having the positioning shaft of the actuating disc aligned to and fitted in the central valve port of the wheel cylinder and having the reserved positioning post resisting against a notch at one side of the wheel cylinder.

However, the conventional wheel cylinder adjuster must prepare two different driving wrenches 10 and 11 in a tool box 1, referring to FIG. 1. The threaded rod 100 of the driving wrench 10 is provided with right-handed threads while the threaded rod 110 of the driving wrench 11 is formed with left-handed threads for respectively adjusting the right-sided and the left-sided wheel cylinders of an automobile, thus elevating cost in manufacturing and purchasing an additional driving wrench and rendering increase of the whole weight of a tool box.

SUMMARY OF THE INVENTION

The objective of this invention is to offer a wheel cylinder adjuster able to adjust the left-sided and the right-sided wheel cylinders of an automobile by means of a single driving wrench cooperating with an actuating disc, reducing cost of manufacturing and purchasing and weight of a tool box.

The wheel cylinder adjuster in the present invention includes a plurality of actuating discs able to match with different-sized wheel cylinders, and a driving wrench able to be axially jointed with the actuating disc. The actuating disc has one side provided with a projecting member having an interior formed with a polygonal insert hole and another side oppositely set with two positioning studs. The driving wrench has two ends of its shank respectively provided with right-handed threads and left-handed threads on the surface, and the shank is bored with an insert hole at an outer side of the right-handed threads and of the left-handed threads and has two ends respectively protruding outward to form a polygonal positioning rod to be inserted in the polygonal insert hole of the actuating disc. Two positioning sleeves are respectively and threadably combined with the right-handed threads and the left-handed threads at two ends of the shank of the driving wrench and respectively have an interior formed with female threads for matching with the right-handed threads and the left-handed threads. A holding rod is to be inserted in one of the two insert holes at two ends of the driving wrench, and a positioning stop plate is provided to position one of the two positioning sleeves.

In addition, each positioning rod at two ends of the driving wrench is disposed with an elastically contractible steel ball.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
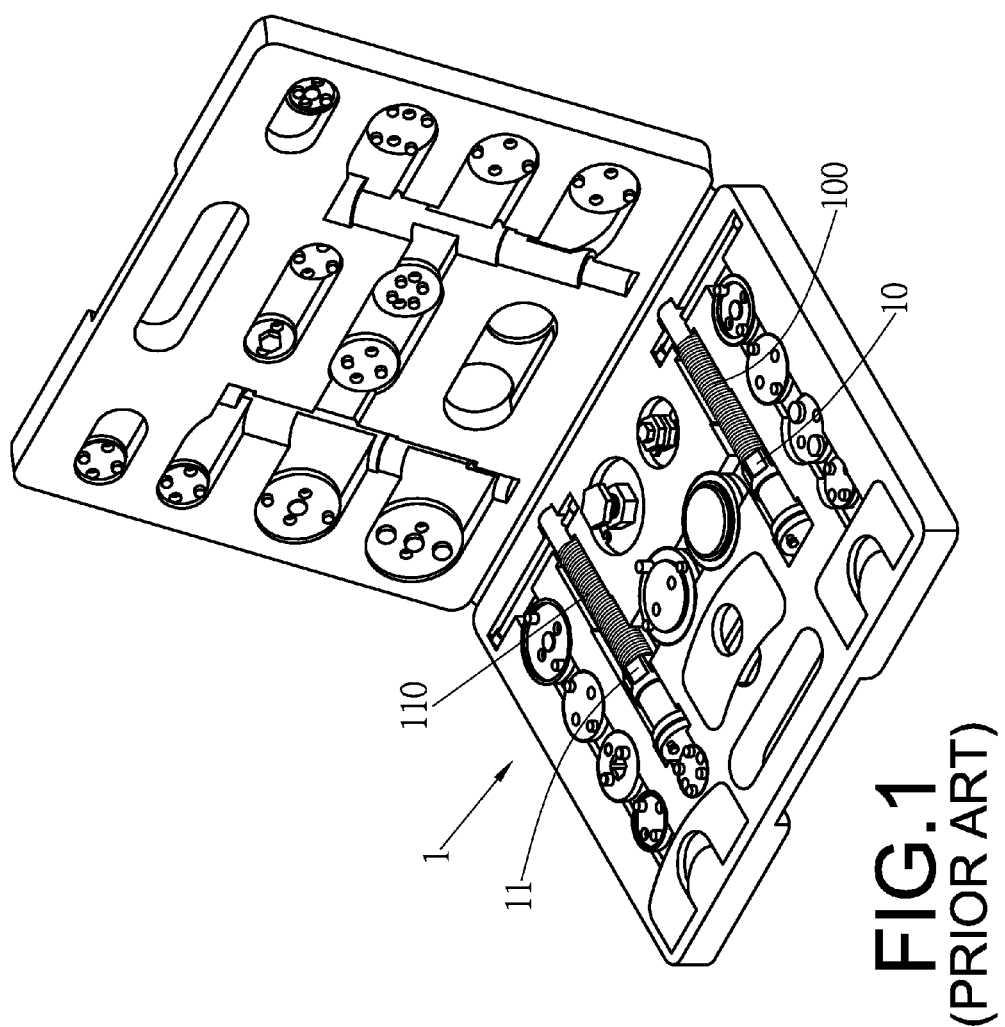
FIG. 1 is a schematic view of a tool box of a conventional wheel cylinder adjuster.
Figure 2:
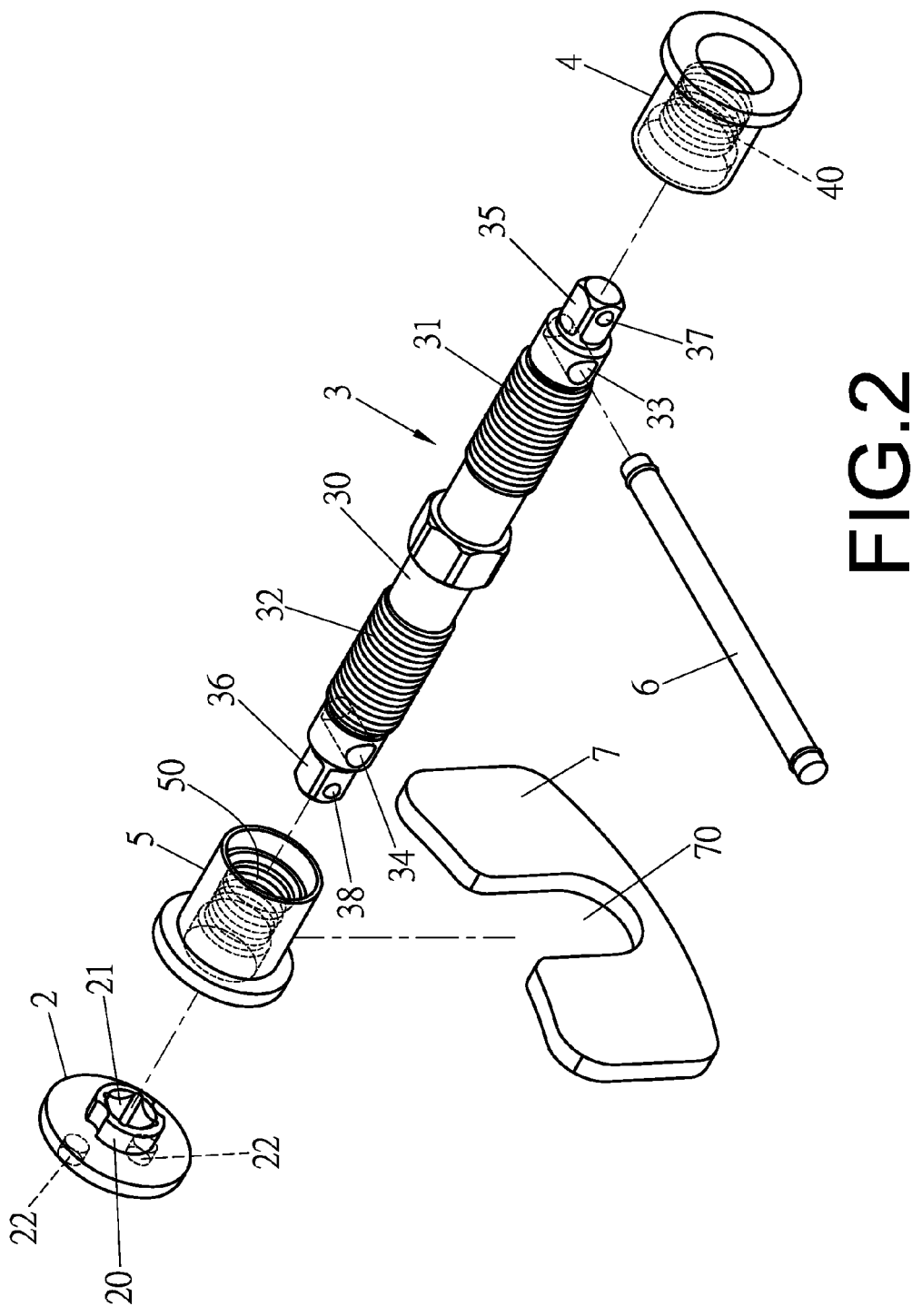
FIG. 2 is an exploded perspective view of a wheel cylinder adjuster in the present invention.
Figure 3:
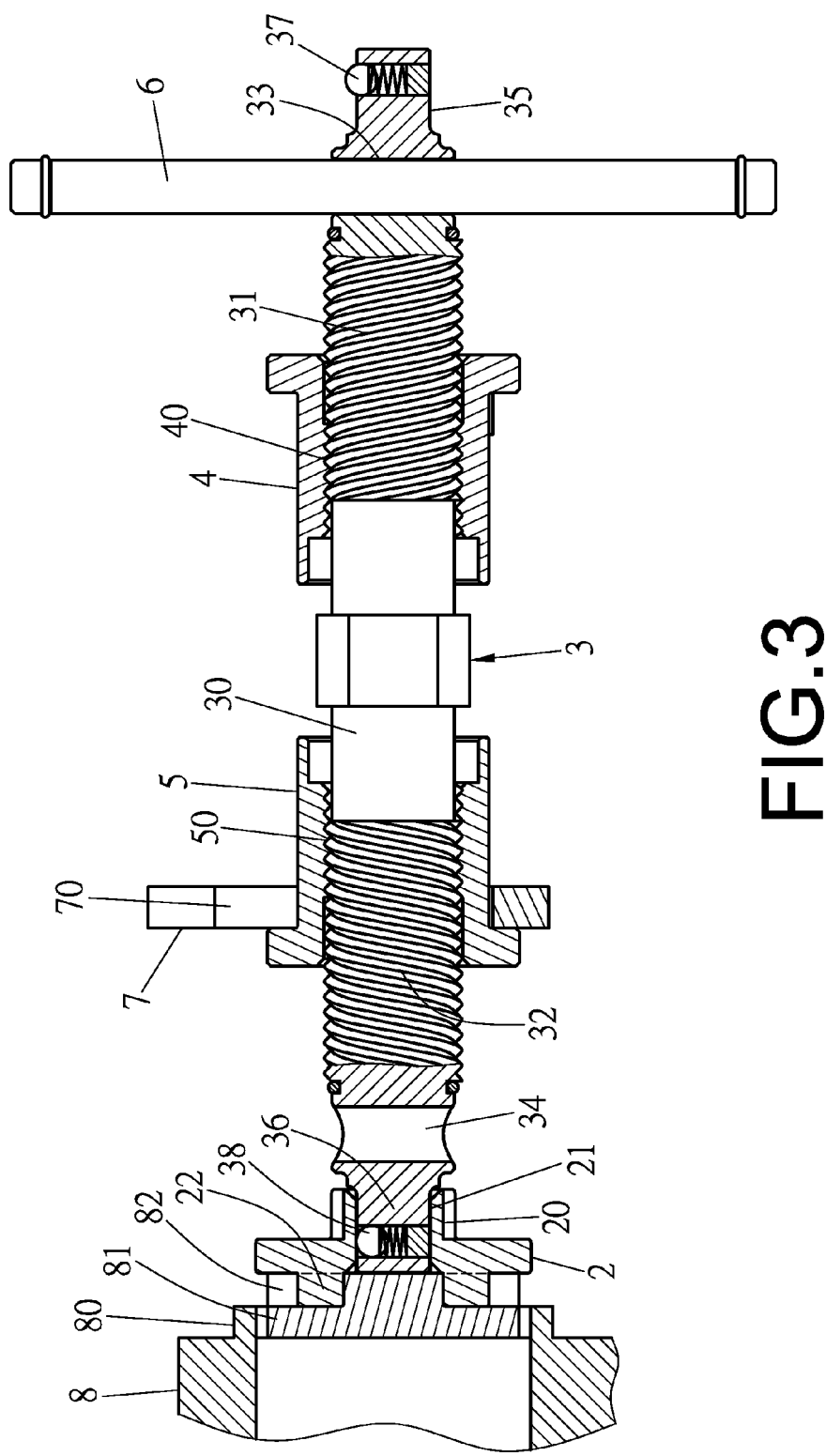
FIG. 3 is a cross-sectional view of the wheel cylinder adjuster used to adjust a left-sided wheel cylinder in the present invention.

A preferred embodiment of a wheel cylinder adjuster in the present invention, as shown in FIGS. 2 and 3, mainly includes a plurality of actuating discs 2 able to be axially jointed with different-sized wheel cylinders 8, and a driving wrench 3 able to be jointed with the actuating disc 2 and actuated to rotate and shift forward axially.

The actuating disc 2 has one side provided in the center with an annular projection 20 formed with a polygonal insert hole 21 and another side oppositely fixed with two positioning studs 22.

The driving wrench 3 is formed with a shank 30 having one end provided with right-handed threads 31 and another end provided with left-handed threads 32 on the surface. The shank 30 of the driving wrench 3 has one end bored with a crosswise insert hole 33 at the outer side of the right-handed threads 31 and another end bored with another crosswise insert hole 34 at the outer side of the left-handed threads 32, further having two ends respectively extended outward to form a polygonal positioning rod 35, 36 to be inserted in the polygonal insert hole 21 of the actuating disc 2. The two positioning rods 35, 36 are respectively set thereon with an elastically contractible positioning steel ball 37, 38. Two positioning sleeves 4 and 5 are to be respectively and threadably combined with the right-handed threads 31 and the left-handed threads 32 at two ends of the shank 30 of the driving wrench 3. The positioning sleeve 4 has an interior provided with female threads 40 to match with the right-handed threads 31 on the shank 30 of the driving wrench 3 while the positioning sleeve 5 has an interior disposed with female threads 50 to match with the left-handed threads 32. A holding rod 6 is to be inserted through either one of the two insert holes 33 or 34 of the driving wrench 3, and a positioning stop plate 7 with a notch 70 is provided for fixing the positioning sleeve 4 or 5.

Figure 4:
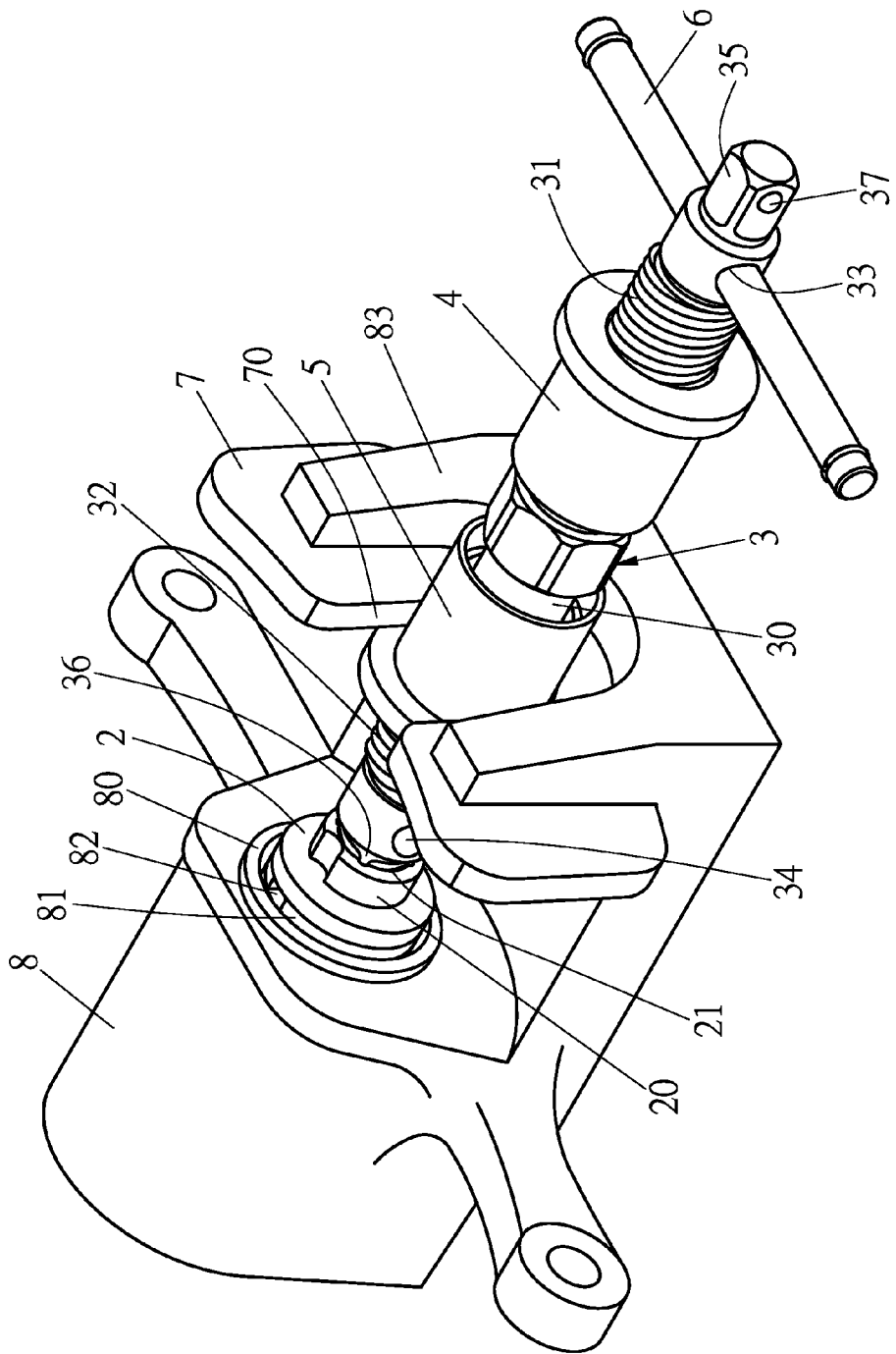
FIG. 4 is a perspective view of the wheel cylinder adjuster used to adjust the left-sided wheel cylinder in the present invention.
Figure 5:
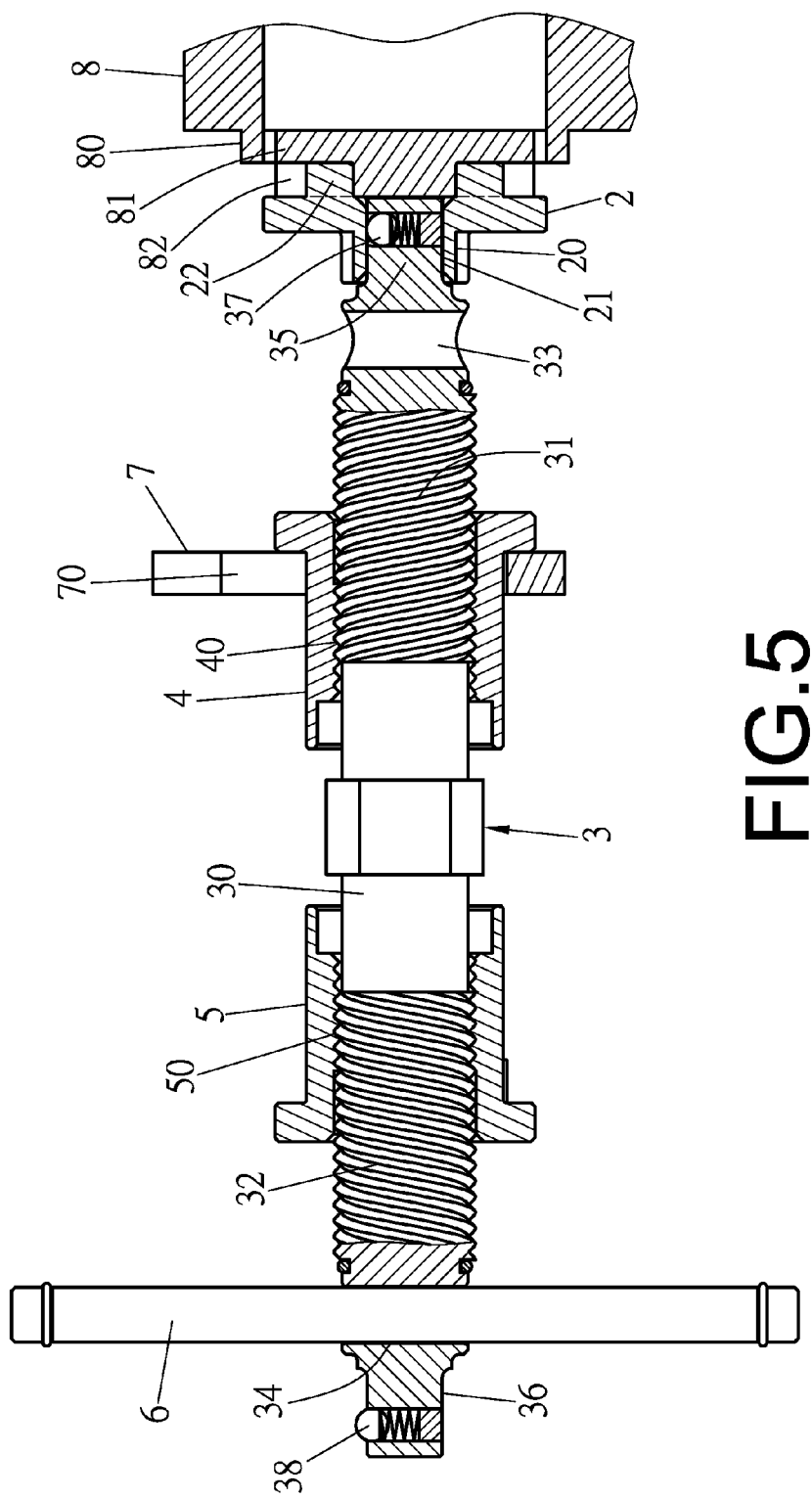
FIG. 5 is a cross-sectional view of the wheel cylinder adjuster used to adjust a right-sided wheel cylinder in the present invention.
Figure 6:
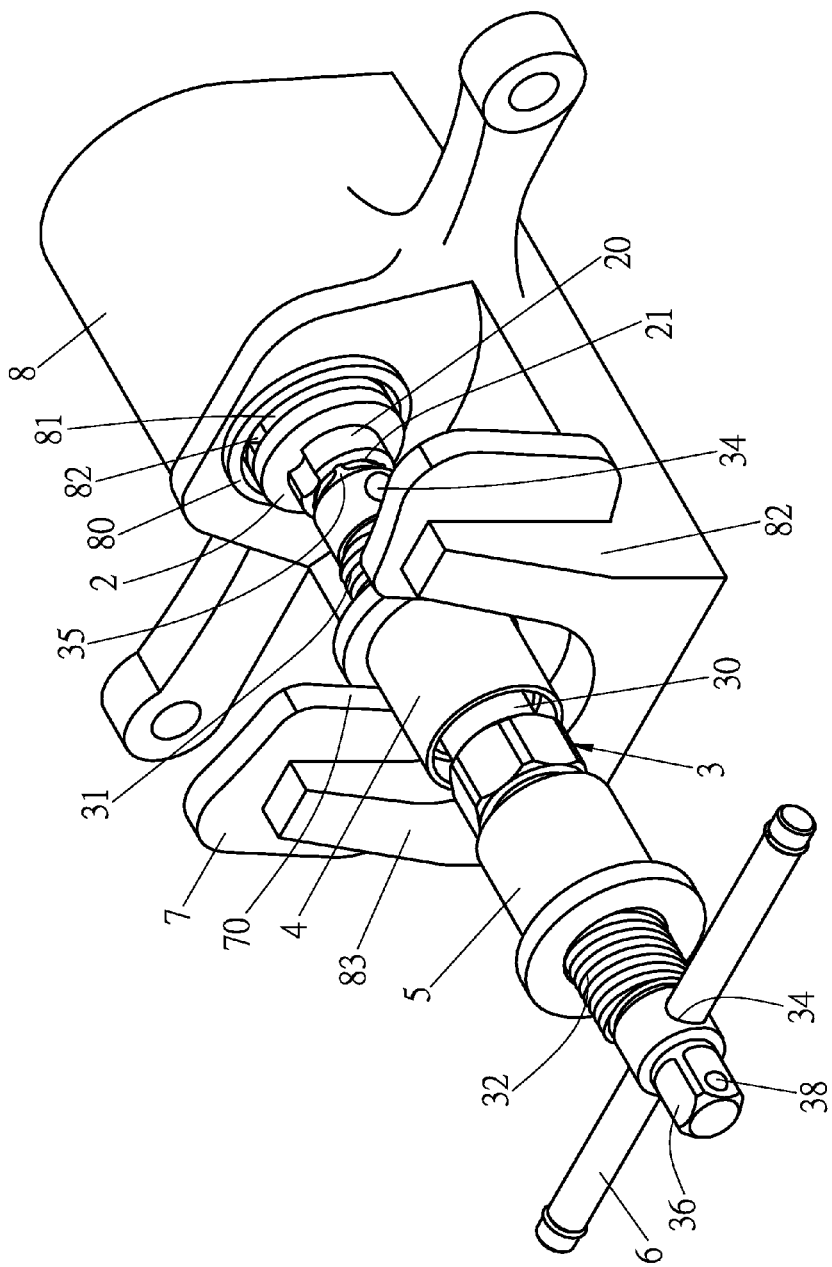
FIG. 6 is a perspective view of the wheel cylinder adjuster used to adjust the right-sided wheel cylinder in the present invention.

In using, referring to FIGS. 2-6, the two positioning sleeves 4, 5 are respectively and threadably combined with the right-handed threads 31 and the left-handed threads 32 on the shank 30 of the driving wrench 3. To adjust the left-sided wheel cylinder 8 of an automobile, as shown in FIGS. 3 and 4, firstly, pick out an actuating disc 2 that matches with the size of a valve body 81 in the valve port 80 of the wheel cylinder 8, and then secure the actuating disc 2 on the positioning rod 36 at the left end of the driving wrench 3. At this time, the positioning steel ball 38 is pushed by the inner wall of the insert hole 21 to be contracted inward elastically and have its surface resisting against the inner wall of the insert hole 21 of the actuating disc 2 to stably position the actuating disc 2 on the positioning rod 36 at the left end of the driving wrench 3. Subsequently, fix the positioning stop plate 7 on a clamping seat 83 of the left-sided wheel cylinder 8 and have both the driving wrench 3 and the positioning sleeve 5 positioned on the left-sided wheel cylinder 8, letting the positioning sleeve 5 engaged on both the positioning stop plate 7 and the clamping seat 83 of the wheel cylinder 8. Afterward, have the two positioning studs 22 of the actuating disc 2 respectively aligned to and engaged with the notches 82 of the valve body 81 of the wheel cylinder 8 and finally, the holding rod 6 is inserted in the insert hole 33 at the right end of the driving wrench 3. Thus, when the holding rod 6 is operated to actuate the driving wrench 3 to rotate and shift forward, the actuating disc 2 will be driven to push inward the valve body 81 in the valve port 80 to move back to its original position to finish adjustment of the left-handed wheel cylinder 8. On the contrary, to adjust the right-sided wheel cylinder 8, as shown in FIGS. 5 and 6, only remove the actuating disc 2 from the left end of the driving wrench 3, and then assemble the actuating disk 2 on the positioning rod 35 at the right end of the driving wrench 3. At this time, as previously described, the positioning steel ball 37 of the positioning rod 35 will be pressed by the inner wall of the insert hole 21 to contract inward elastically to have the surface of the positioning ball 37 resisting against the inner wall of the insert hole 21 of the actuating disc 2, thus stably positioning the actuating disc 2 on the positioning rod 35 at the right end of the driving wrench 3. Next, remove the holding rod 6 out of the insert hole 33 at the right end of the driving wrench 3 and have it inserted in the insert hole 34 at the left end of the driving wrench 3. Subsequently, fix the positioning stop plate 7 on the clamping seat 83 of the right-sided wheel cylinder 8 and position both the driving wrench 3 and the positioning sleeve 4 on the right-sided wheel cylinder 8, letting the positioning sleeve 4 engaged on both the positioning stop plate 7 and the clamping seat 83 of the wheel cylinder 8 and then, have the positioning studs 22 of the actuating disc 2 respectively aligned to and engaged in the notches 82 of the valve body 81 of the wheel cylinder 8. When the holding rod 6 is turned around to make the driving wrench 3 rotate and shift forward, the actuating disc 2 will be actuated to push inward the valve body 81 in the valve port 80 to move back to its original position, thus finishing adjustment of the right-sided wheel cylinder 8.

Specifically, after a different-sized actuating disc 2 is stably combined with the positioning rod 35 or 36 at the end of the single driving wrench 3 and the two positioning sleeves 4 and 5 are respectively and threadably combined with the right-handed threads 31 and the left-handed threads 32 at two ends of the shank 30 of the driving wrench 3, the left-sided and the right-sided wheel cylinder 8 of an automobile can conveniently be adjusted by the single driving wrench 3 cooperating with the actuating disc 2. Therefore, the wheel cylinder adjuster of this invention can reduce cost of manufacturing and purchasing, and weight of a tool box for facilitating to be carried about.

While the preferred embodiment of the invention has been described above, it will be recognized and understood that various modifications may be made therein and the appended claims are intended to cover all such modifications that may fall within the spirit and scope of the invention.

What is claimed is:

1. A wheel cylinder adjuster comprising a plurality of actuating discs and a driving wrench, said actuating discs able to match with different-sized wheel cylinders, said driving wrench able to be jointed with said actuating disc, said actuating disc having one side provided with an annular projection, said annular projection formed with a polygonal insert hole, said actuating disc having another side oppositely disposed with at least two positioning studs, said driving wrench formed with a shank, said shank having one end provided with right-handed threads and another end provided with left-handed threads on a surface, said shank bored with a crosswise insert hole at a location of the outer side of said right-handed threads and of the outer side of said left-handed threads, said shank of said driving wrench having two ends respectively protruding outward to form a polygonal positioning rod, said positioning rod inserted in said polygonal insert hole of said actuating disc, two positioning sleeves respectively and threadably combined with said right-handed threads and said left-handed threads at two ends of said shank of said driving wrench, said two positioning sleeves having an interior respectively formed with female threads to match with said right-handed threads and said left-handed threads on said shank of said driving wrench, a holding rod inserted in either one of said crosswise insert holes at two ends of said driving wrench, a positioning stop plate provided to fix one of said two positioning sleeves.

2. The wheel cylinder adjuster as claimed in claim 1, wherein said driving wrench has two said positioning rods respectively set with an elastically contractible positioning steel ball.

* * * * *